July 30, 1940.  J. W. OVERBEKE  2,209,418
VALVE
Filed July 13, 1939  2 Sheets-Sheet 1
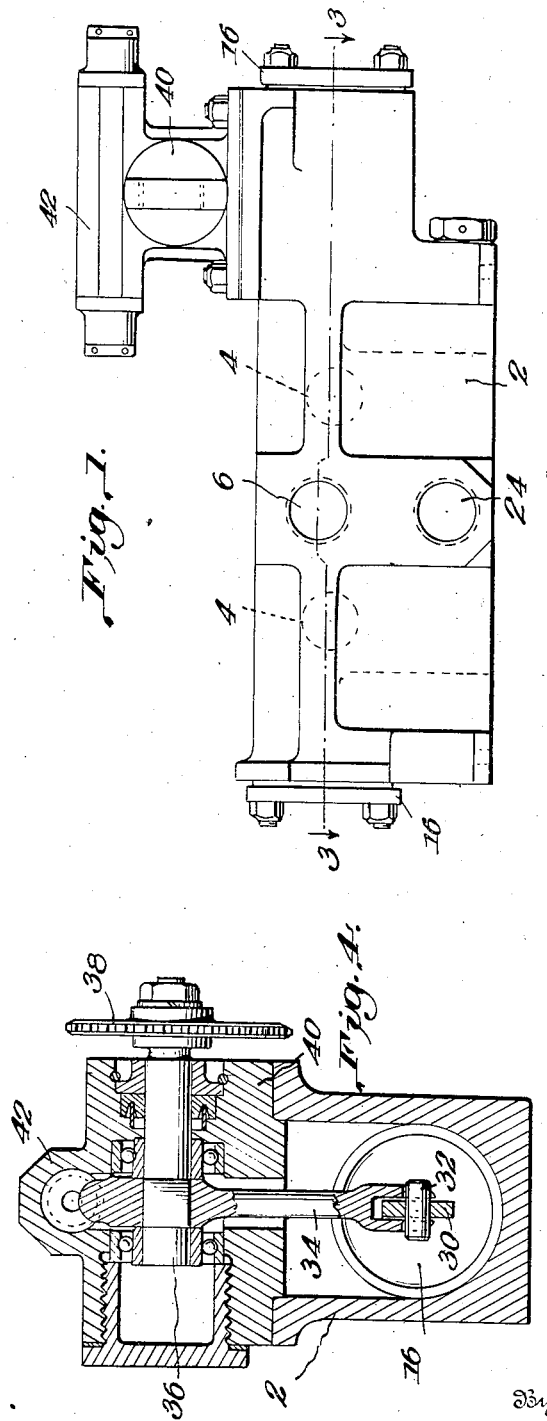
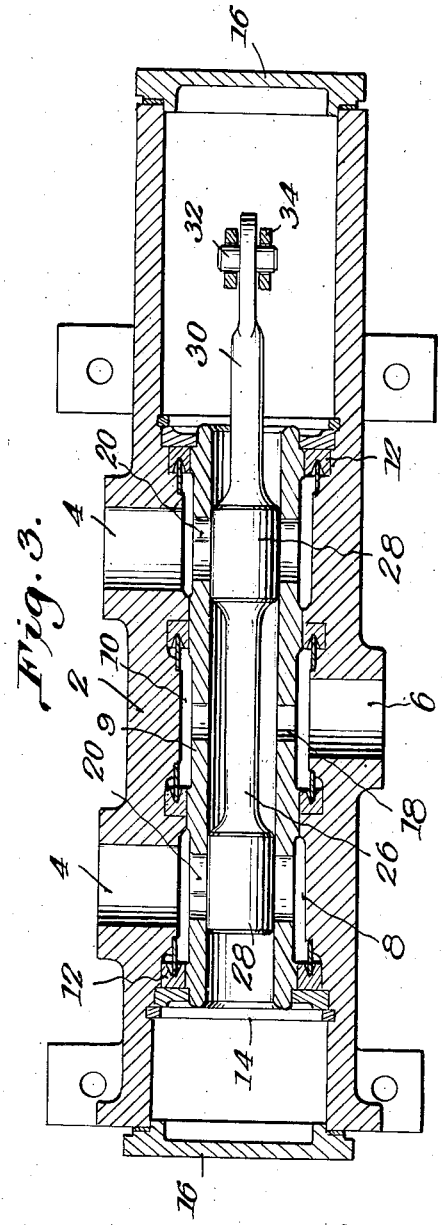
Inventor
John W. Overbeke,
By
Harrison Gale
Attorney July 30, 1940. J. W. OVERBEKE 2,209,418
VALVE
Filed July 13, 1939 2 Sheets-Sheet 2

Inventor
John W. Overbeke,
By Harrison Gale
Attorney

Patented July 30, 1940

2,209,418

UNITED STATES PATENT OFFICE 2,209,418

VALVE

John W. Overbeke, Anneslie, Md., assignor to The Glenn L. Martin Company, Baltimore, Md.

Application July 13, 1939, Serial No. 284,277

2 Claims. (Cl. 251—76)

The invention relates to valves and particularly to metering valves especially intended for the control of hydraulic devices.

The primary object of the invention is to provide a valve of this type which can be operated by a very small force applied thereto, even though the valve is used to control fluids under very high pressures, the force required being independent of the pressure.

A second object is to provide a balanced valve which can thus be moved easily.

Still another object is to provide a valve having centering means which move the valve to a central closed position, these means being of simple construction because of the small force required to move the valve.

A further object of the invention is to provide a valve of this type with metering means which control the pressure line quite exactly, while providing an ample opening for the return line.

Another object of the invention is to provide a structure so arranged as to make replacement of the essential valve parts easy.

Further objects and advantages of the invention will appear more fully from the following description, particularly when taken in conjunction with the accompanying drawings which form a part thereof.

In the drawings:

Fig. 1 shows the valve in side elevation;

Fig. 3 is a horizontal cross section on the line 3—3 of Fig. 1; and

Fig. 4 is a cross section on the line 4—4 of Fig. 2.

Figure 2:
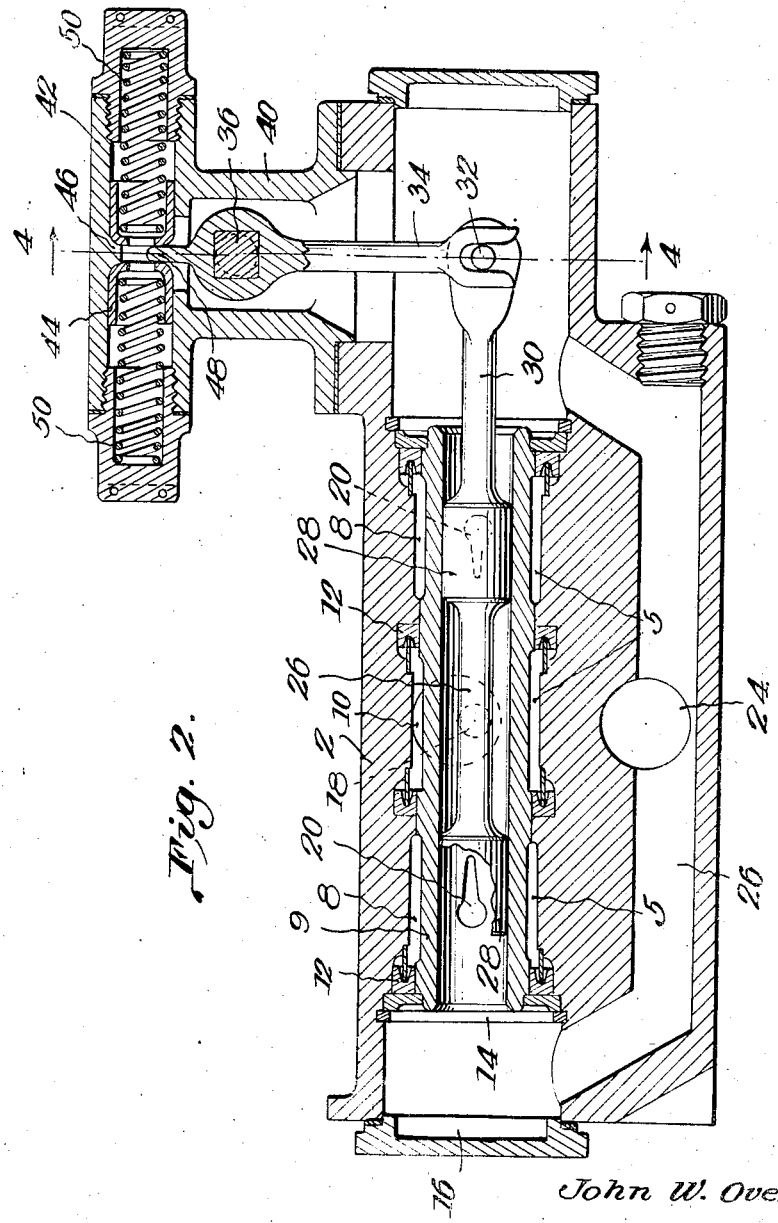
Fig. 2 is a vertical cross section therethrough.

The invention is particularly intended for the control of a hydraulic cylinder, to opposite ends of which pressure fluid is to be selectively supplied to move a piston therein. The valve casing 2 is therefore supplied with two ports 4 which are to be connected to opposite ends of the cylinder. These ports communicate with a longitudinal bore 5 on opposite sides of the inlet port 6 which is to be connected to a source of fluid under pressure.

A hollow sleeve 9 is arranged in the bore 5. This sleeve has projections cooperating with the bore walls to form three separate annular chamber 8, 8 and 10 opposite the ports 4, 4 and 6 respectively. Suitable sealing rings such as 12 make these chambers fluid-tight. The whole sleeve is held in position by resilient snap rings 14 at its ends, and can be removed from casing 2 through plugs 16 at the ends of bore 5.

The three annular chambers 8, 8 and 10 communicate with the interior of the sleeve. A port 18 connects the chamber 10 with the central portion of the sleeve. Ports 20, which connect the chambers 8 to the interior of the sleeve, are arranged as metering ports, being of elongated tapered shape of increasing width outwardly towards the ends of the sleeve.

The ends of bore 5 communicate through a passage 22 with a discharge outlet 24 which may be connected to the source from which the pump draws the fluid.

Slidable in the sleeve 9 is a movable valve member having a stem portion 26 of less diameter than the sleeve located between two enlarged portions 28. These enlarged portions overlie and close the ports 20 in the normal position, shown in the drawings.

The valve member is normally held in the centered position shown by the centering means located at the right of Fig. 2. The valve has a stem 30 which carries a pin 32 engaged in a fork in the end of lever 34 mounted non-rotatably on a turntable shaft 36. This shaft extends outside the casing and is provided with a wheel 38 by which it may be turned to move the valve member.

Lever 34 extends into an upward projection 40 of casing 2 which is provided with opposed cylindrical members 42. Slidable in members 42 are cups 44, between which is located a stop 46 so as to limit movement of the cups toward each other. Between cups 44 is arranged an upward extension 48 of lever 34, so that the cups both engage the lever when the valve is in normal position. Coil springs 50 arranged in the cylindrical portions 42 extend into the cups 44 and press them against lever extension 48.

The operation of the valve is as follows: When the parts are in the neutral position shown, pressure fluid in the central portion of the sleeve, supplied by inlets 6 and 18, is ineffective because the outlets 20 are closed by portions 28. Since the pressure is exerted equally in both directions on the valve member, it will have no tendency to move and the centering means will prevent any movement which might be caused by sudden shocks exerted thereon.

Assuming that the wheel 38 is turned so as to move the lever 34 in one direction, say clockwise (Fig. 2), the movable valve member will move to the left. This will uncover the right-hand end of each of openings 20. Fluid will flow from inlets 6, 18 to the left opening 20, which is of small width so that the flow of fluid will be slight. The right-hand opening, of which the part of greatest width is uncovered, will communicate through passage 22 with discharge 24. Thus the return passage for fluid will be greater than the supply passage, which avoids any danger of blocking the movement to be caused by the pressure fluid. During all such movement, the pressures in opposite directions on the valve remain equal, so that the valve stays balanced.

When lever 34 turns, it compresses right-hand spring 50, while compression of the left-hand spring is stopped by engagement of cup 44 with stop 46. Thus, when the force exerted on handle 38 is released, spring 50 will move the lever and valve member back to normal position. This it can do because of the balancing of the pressures on the valve which permits a small force exerted by the spring to move the valve.

While I have described herein one embodiment of my invention, I wish it to be understood that I do not intend to limit myself thereby except within the scope of the appended claims.

I claim:

1. A valve comprising a cylindrical guide, said guide having an inlet thereinto, and a pair of outlets arranged on opposite sides of said inlet, a valve member slidable in said guide and having spaced enlarged portions normally closing said outlets, the portion between said enlarged portions being of less diameter so as to provide a space opposite said inlet, discharge means communicating with the ends of said guide member outside of said enlarged portions, and centering means for normally holding said slidable valve member in a position to close both said outlets, said centering means comprising a pivoted lever having a pivotal connection with said slidable valve member, slidable members normally engaging a portion of said lever, means to limit the movement of said slidable members against said lever to a position corresponding to the centered position of said movable valve member, and spring means urging said slidable members against said lever.

2. In a valve comprising a cylindrical guide and a valve member slidable in said guide, centering means for normally holding said slidable valve member in a predetermined position, said centering means comprising a pivoted lever having a pivotal connection with said slidable valve member, slidable members normally engaging a portion of said lever, means to limit the movement of said slidable members against said lever to the position corresponding to the predetermined position of said movable valve member, and spring means urging said slidable members against said lever.

JOHN W. OVERBEKE.